US005504859A

United States Patent [19]
Gustafson et al.

[11] Patent Number: 5,504,859
[45] Date of Patent: Apr. 2, 1996

[54] DATA PROCESSOR WITH ENHANCED ERROR RECOVERY

[75] Inventors: Richard N. Gustafson, Rye, N.H.; John S. Liptay, Rhinebeck; Charles F. Webb, Poughkeepsie, both of N.Y.

[73] Assignee: International Business Machines Corporation, Armonk, N.Y.

[21] Appl. No.: 149,260

[22] Filed: Nov. 9, 1993

[51] Int. Cl.⁶ .................................................. G06F 11/16
[52] U.S. Cl. .............................. 395/182.09; 395/182.04
[58] Field of Search .............................. 395/575, 182.09, 395/182.04; 371/68.1, 68.3

[56] References Cited

U.S. PATENT DOCUMENTS

| | | | |
|---|---|---|---|
| 4,358,823 | 11/1982 | McDonald et al. | 364/200 |
| 4,541,094 | 9/1985 | Stiffler et al. | 371/68 |
| 4,852,092 | 7/1989 | Makita . | |
| 4,912,707 | 3/1990 | Kogge et al. | 371/12 |
| 4,958,273 | 9/1990 | Anderson et al. | 364/200 |
| 5,005,174 | 4/1991 | Bruckert et al. . | |
| 5,016,249 | 5/1991 | Hurst et al. . | |
| 5,029,071 | 7/1991 | Kinoshita . | |
| 5,136,595 | 8/1992 | Kimura . | |
| 5,193,175 | 3/1993 | Cutts, Jr. et al. | 395/575 |
| 5,218,606 | 6/1993 | Eguchi et al. . | |
| 5,260,952 | 11/1993 | Peilstein, Jr. et al. | 371/63 |
| 5,317,726 | 5/1994 | Horst | 395/575 |
| 5,353,436 | 10/1994 | Horst | 395/550 |

OTHER PUBLICATIONS

Microsoft Press, Computer Dictionary 2d ed. (1994) at 334.
Nohilly & Lund, IBM ES/9000™ System Architecture and Hardware, IEEE Int. Conf. on Comp. Design! VLSI in Comp & Proc., Oct. 14–16, 1991, at 540.
Spainhower et al., IBM's ES/9000 Model 982's fault-tolerant design for consolidation, IEEE Micro, Feb. 1994 at 48.
Spainhower et al., Design for Fault-Tolerance in System ES/9000 model 900, Fault Tolerant Computing, 1992 Int'l. Symposium, at 38.

Primary Examiner—Robert W. Beausoliel, Jr.
Assistant Examiner—Alan M. Fisch
Attorney, Agent, or Firm—Whitham, Curtis, Whitham & McGinn; Lynn L. Augspurger

[57] ABSTRACT

Error detection and recovery is provided in a processor of small size and which can be integrated on a single chip by providing buffers for both data and processor status codes in order to contain errors until a subsequent check point preferably generated at the termination of each instruction is reached without detection of an error. Retry of an instruction can therefore be initiated using the status and data validated at the termination of the previous check point and without placing error correction processing in any critical path of the processor. Error detection is accomplished by comparing outputs of at least a pair of unchecked processors for both memory access requests and output data and status codes. Input to the processors is subjected to a parity check and parity check bits are generated for memory access requests. Error correcting codes are generated for data and status codes to allow correction of single bit errors during transmission within the processor or at a storage system. When an error is detected, all data which has not been validated, preferably by changing the logical value of a flag bit associated with each code, at the most recently generated check point is erased. Data codes in which the flag bit has been changed may be transferred to a storage system autonomously even after an error has occurred.

16 Claims, 3 Drawing Sheets

DATA PROCESSOR WITH ENHANCED ERROR RECOVERY

DESCRIPTION

BACKGROUND OF THE INVENTION

1. Field of the Invention

The present invention generally relates to data processors having error detection capability and, more particularly, to the provision of automatic recovery from transient errors, including error correction, in data processors generally, including mainframes as well as data processors suitable for use in personal and notebook computers and work stations.

2. Description of the Prior Art

Due to the sheer numbers of components present in computers and data processors, the possibility of errors arising in signals representing either data or control commands, including processor status data, has been of great concern to designers of computer systems. An undetected error in processing of data can result in propagation of erroneous data each time a further operation is performed on it or any processed data derived from the erroneous signal. An error in a command or status code can result in even more rapid propagation of both corrupted data and corruption of good data by incorrect processing. Efforts to minimize or contain the effects of malfunctions have included efforts to reduce their frequency of occurrence, failure detection techniques and computer designs which allow the computer to continue operation after a transient failure has occurred or even while a failure is continuing. While the frequency of failures has been reduced by several orders of magnitude over the last few decades, the miniaturization of many components such as dynamic random access memory (DRAM) cells, which can be discharged or erased by energetic particles, continues to make error detection and recovery a major concern to computer system designers.

A variety of techniques in logic design have been used to deal with data processor failures and the problems which may be engendered thereby. An early technique for detection of dropped bits was the provision of parity coding of data in which a bit was set at logical "1" or "0" in dependence on the number of bits in a data string of fixed length (e.g. a "byte") which were of a particular logical value.

Another technique which is currently familiar in correcting data errors (but not control code errors due to the number of bits required) is called error correcting codes (ECC) which uses a plurality of additional bits in order to allow determination of the particular bit in a code segment which has erroneously changed. Essentially, error correcting codes use a parity bit for each of a plurality of different groups of bits in the code segment or byte so that a particular bit location can be isolated and corrected. These kinds of coding allow error detection and make it possible for processor operation to continue even while the failure exists since the data can be corrected. However, in view of the amount of storage which may be required for parity bits and error correction codes and well as the circuitry to implement error detection and correction within the processor, full utilization of these techniques has generally been limited to mainframe computers.

Conversely, in personal computers, at most, only parity checking is usually provided because of the cost of additional logic to implement error correction. The increased reliability of components has allowed personal computers and work stations to use processors which have no error checking facility at all. It has been considered sufficient in these systems to provide back-up storage arrangements in software to limit the amount of data lost when a malfunction results in loss of or the need to discard a corrupted file. Utility applications are also known which may allow reconstruction of a corrupted file. However, very recently, to increase the processing power available to a plurality of users, it has become the practice to interconnect many personal computers and/or terminals with a network. This approach also limits the costs resulting from obsolescence of data processing equipment since individual units can often be replaced on a piecemeal basis.

However, in such a network application, the problems which may be caused by a malfunction or transient error may approach the gravity of a malfunction in a mainframe computer while fewer, if any, precautions have been taken to detect errors and none may be available for error recovery. On the other hand, such systems and other multi-processor environments do present the recovery possibility of isolating or disconnecting a malfunctioning processor and continuing processing with another processor. Such arrangements are known in the art as alternate processor recovery but require the cooperation of the operating system in order to be implemented.

Even in mainframe computers, the provision of error detection and error recovery has been costly in terms of both hardware and software expense and processor performance. By some estimates, as much as 30% of the data processing circuits in a mainframe computer may be used for error checking. These circuits take up space in the central processing unit, making it physically larger with longer signal paths and consequent limitations on cycle times. Some error check circuits are undoubtedly present, possibly serially, in some so-called critical paths within the processor and may limit cycle times further. The existence of these error detection and correction circuits also make central processing units more difficult to design and to debug. Nevertheless, these costs have been considered justified because an entire business or enterprise may rely on the operation of a computer.

It has been long recognized that a highly effective error checking technique could be accomplished by running two identical processors in parallel, performing the identical operation on identical data and comparing the results. Extension of the technique to three processors can also allow error recovery by choosing a coincident result of two of the three processors as the correct result. However, the cost of processors has historically limited such triple redundancy arrangements to applications where high reliability was of extreme importance and technical intervention was limited or impossible, such as in space vehicles. Redundant processors, however, continue to be used as an error detection technique, particularly as the cost of processors has decreased, although the use of two processors does not inherently provide for error recovery.

In addition to the parity checking (which was originally inapplicable to control codes but has recently been extended thereto) and error correcting code techniques applied to data as mentioned above, check circuits have been provided to detect certain illogical combinations of operations and/or control codes. However, no comprehensive or systematic technique for doing so has been devised in view of the flexibility for combinations of operations and controls which must be maintained in computers. Further, circuitry adapted to sense particular conditions or related types of conditions often require significant space and numerous such circuits are often required for differing types of conditions.

The concept of a "retry" mechanism has been used for error recovery in which sufficient status information is retained by the processor or its peripheral memory to allow the processor to return to an earlier point and resume operation from that point in the event of a failure. This allows the processor to continue operation even when a transient failure occurs or even in limited circumstances when a permanent failure occurs. The retention of data and status information also allows the "resumption" of processing to be transferred to another processor, if available, as may be possible in redundant processor systems and networks. However, retry mechanisms have also required substantial space and can require significant structure to maintain synchronism with the remainder of the processing system because of the time required for retry to occur.

Therefore, in summary, it is seen that many different approaches to error detection and recovery have been attempted but all have required substantial costs in terms of design time, hardware and processor performance and which have led to omission of such provisions in small computers. However, as networking of small computers and work stations has led to larger installations, the importance of integrity and reliability of the installations has become greatly increased if not critical to users and the enterprises which rely on them. It is therefore clear that inclusion of error checking and correction may shortly become a requisite feature of even the smallest of computers. Further, there has heretofore been no integration of the capabilities of the above mentioned techniques, particularly at small size and without severe processor design complications.

SUMMARY OF THE INVENTION

It is therefore an object of the present invention to provide an error checking and recovery system of high sensitivity and can be integrated with data processor circuitry on a single chip.

It is another object of the invention to provide an error recovery arrangement which extends error correcting code techniques to processor control codes.

It is a further object of the invention to provide an error checking and recovery system which integrates the features of parity checking, error correction code techniques, redundant processors with result comparison and retry while supporting alternate processor recovery in a manner consistent with the above objects of the invention.

In order to accomplish these and other objects of the invention, a data processing system is provided including at least a pair of processors arranged to perform identical operations on identical data, a status register for storing processor status information which corresponds to a current instruction, a parity checking means for detecting errors in data input to the processors, an arrangement for comparing outputs of the processors and generating parity and error correcting codes in accordance with outputs of the processors, buffers for correcting and storing outputs of the processors in accordance with the error correcting codes, an error detection arrangement responsive to the parity checking arrangement and the arrangement for comparing outputs of the processors for inhibiting updating of the status register with contents of the buffers and initiating retry of execution of a current instruction in accordance with contents of the status register.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
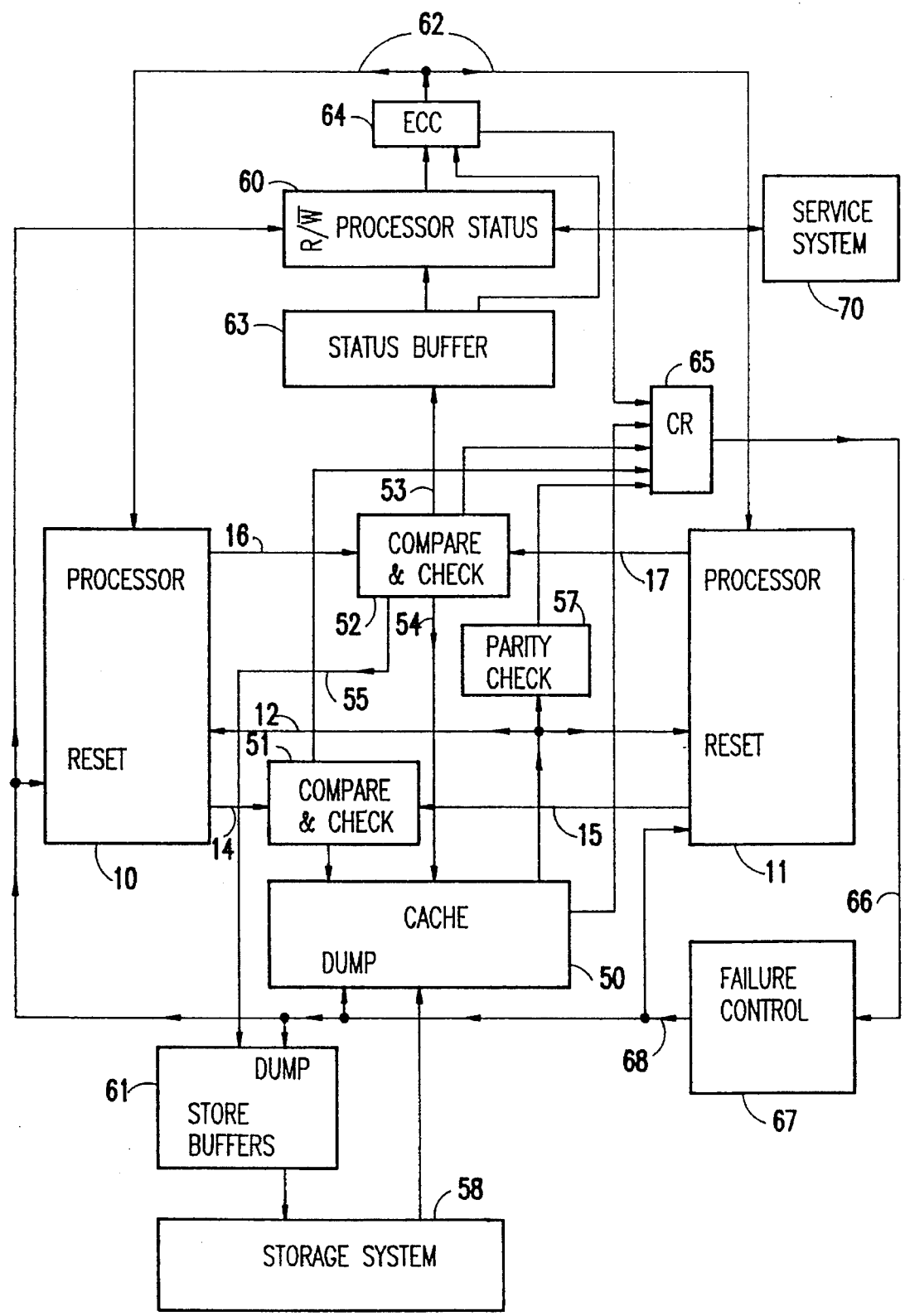
FIG. 1 is a schematic illustration of a preferred form of the invention.

Referring now to the drawings, and more particularly to FIG. 1, there is shown, in schematic form, the basic architecture of a central processing unit CPU. The CPU comprises all numbered elements of FIG. 1 except system storage 58, and similarly all numbered elements of FIG. 2, except system storage 58 including an error checking and recovery system in accordance with the invention. In both FIGS. 1 and 2 which describe the invention, the CPU is to be understood as including in our preferred embodiments all of the elements of the Figure except for system storage 58 to which the CPU is coupled via a bus. The preferred form of the invention employs a store-through cache to interface with a storage system which may be a singular mass storage system or a distributed resource (e.g. utilizing the local storage systems associated with a plurality of processors and/or work stations connected to a network and which may or may not further include one or more mass storage systems). It should be noted that FIG. 2 differs from FIG. 1 only in the use of a store-in cache rather than a store-through cache. Further, it is to be understood that a cache is not required for practice of the invention and can be omitted altogether by providing direct communication to storage system 52.

The central processing unit (CPU) in accordance with the invention includes at least two unchecked processors operating in parallel on the same data and in accordance with identical instructions. It is to be understood that the principles of the invention can be extended to more than two processors and may allow increased flexibility of error recovery, for example, by majority logic mentioned above. The use of unchecked processors permits the processors to be fabricated at smaller size than if error checking circuitry is included within the processors. The savings in chip space is particularly significant if CMOS technology is used. By the same token, the design of the processors is not complicated by the inclusion of error checking and correction circuitry and no error checking or error correction circuitry can appear in any critical path to slow cycle times.

In this regard, it is a basic concept of the invention that it is not important to discover the source of a transient error within a processor since transient errors can occur anywhere within the CPU and errors must be found and corrected outside the processors, as well. It is important, however, to contain any error which may occur. It is therefore considered sufficient, in accordance with the invention, to detect errors and provide for error recovery at a relatively few points where codes are communicated within the central processing unit to locations from which such codes can be released from the CPU (e.g. results which change storage). Therefore, the required size of the error checking circuitry is very limited and, together with the reduced size of the unchecked processors, the CPU in accordance with the invention can be fabricated on a single chip.

Figure 2:
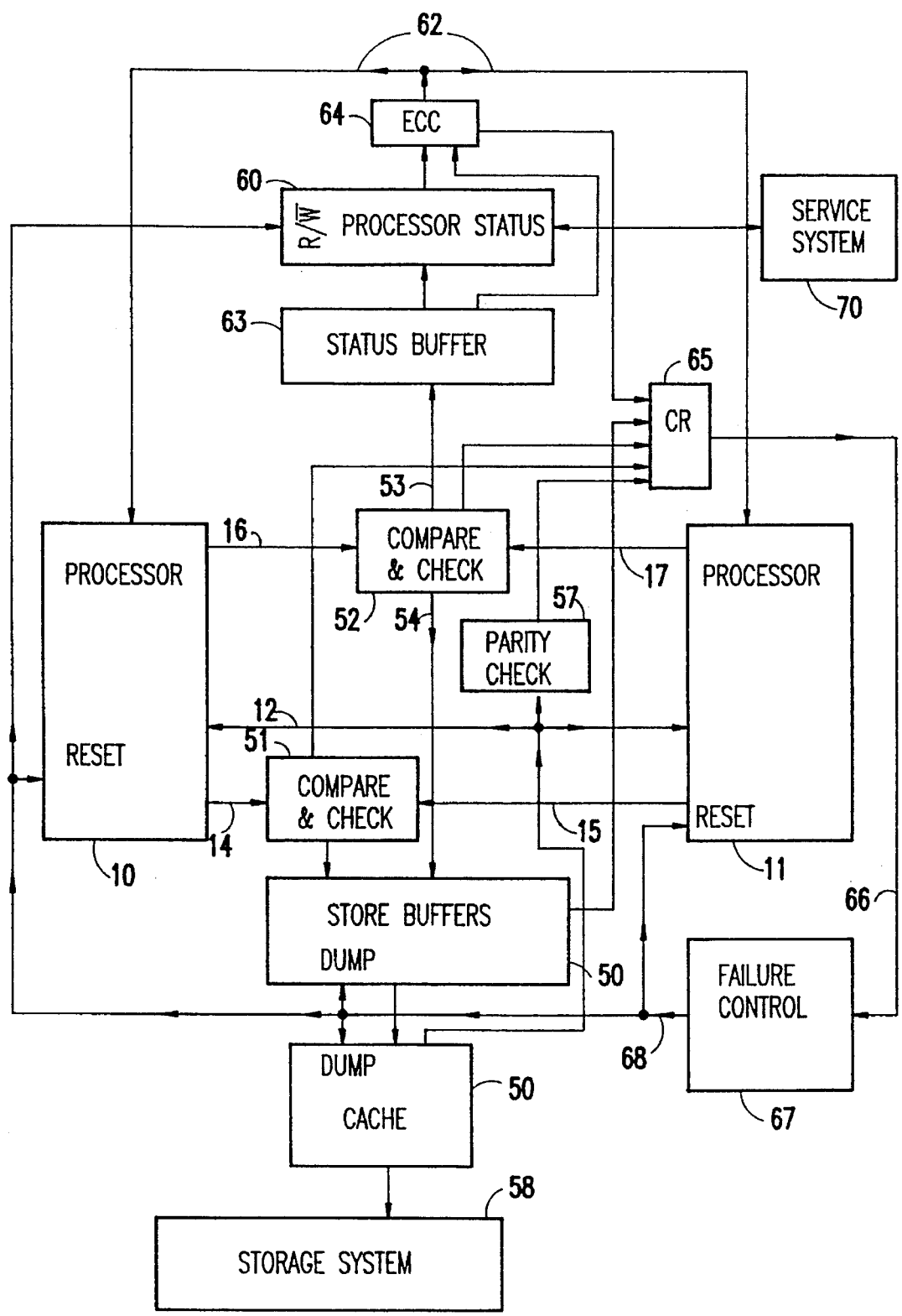
FIG. 2 is a schematic illustration of a form of the invention showing use of a store-in cache.

As shown in FIGS. 1 and 2, three buses (e.g. memory access request or address bus 14, 15, data or return bus 12 and result or control bus 16, 17) are provided for communication with each processor as is generally common in the art. The form of these buses is unimportant to the practice of the invention as are the internal details of the processors. These buses provide the communication nodes at which error checking is done in accordance with the invention.

Specifically, the return bus 12, which returns data in response to a processor memory access request is checked for parity to assure that no dropped bits are present in the data communicated from storage system 52 and/or cache 50 as the data is made available to processors 10 and 11. The form of parity check circuit is also unimportant to the practice of the invention and many suitable arrangements are known in the art.

Outputs of the processors appear on buses 14, 15, 16 and 17 and error checking is done by result comparison in compare and check circuits 51 and 52. Again, the form of compare and check circuit is unimportant to the practice of the invention but digital comparison could, for example, be done by Exclusive ORing of respective bits output from each of processors 10 and 11. Compare and check circuit 52 also is provided with the facility for generating an error correcting code (e.g. Hamming code). Parity bit generation is provided by compare and check circuit 51. If the code comparison is successful, the respective bus input to the respective compare and check circuits are passed to buffers 61 and 63 which provide for storage and queuing of these signals until updating of storage is permitted. Thus, buffers 61 and 63 function to provide containment of potentially erroneous data while other storage retains prior data which may be used in error recovery as will be discussed below.

It should be noted for a full appreciation of the invention that the structure discussed thus far is highly symmetrical. That is, the processors, comparison portions of the compare and check circuits and buffers are largely identical in structure and function. This attribute of the invention can be exploited to simplify integration of the invention on a single chip (e.g. by reflection or rotation of the layout of devices of which these circuit elements are formed as well as the interconnections therebetween such as buses 12 and 14-17 and connections 53 and 55). Parity check circuit 57 and the error correcting code generation portion of compare and check circuit 52 and other storage circuits can readily be added to this basic layout.

Operationally, the CPU, while containing redundant structure, functions as a single processor since, in the absence of error, both processors 10 and 11 produce precisely the same outputs on respective buses. While it is preferred that the processors include the logic necessary to fetch and decode instructions, fetch operands, compute results and perform and implement other control functions characteristic of particular processor design conventions and include registers to retain information which is preserved from one operation to another and which defines the state of the system, all that is relevant to the practice of the invention is that the results of instructions and individual operations therein be presented in the same logical order that the instructions are executed in any program which may be executed thereon.

When processors 10 and 11 issue a request for data and the requests are found to coincide at compare and check circuit 51, the compare and check circuit 51 additionally generates a parity signal (e.g. a parity bit) for the signal and the request and the parity signal are sent to cache 50 (or storage system 52 if no cache is used). It is assumed, as is common that both the cache 50, if used, and the storage system 52 include an arrangement for checking parity of any request for a memory operation and all logic necessary for responding to data requests from the processors, including address translation logic and directories as well as the cache or storage memory array. Data are assumed to be stored with a parity bit in order to detect single bit errors during read-out. Cache 50 is also assumed to have all logic necessary to interact with storage system 52, including prefetch and paging protocols. However, details of such operations are not important to the practice of the invention and are well-understood by those skilled in the art.

Once a request has been accepted by cache 50 or storage system 52, the accessed data is returned over bus 12 where another parity check is made at parity check element 57. Thus, the data is checked for a dropped bit as it is made available to the processors 10, 11 in addition to any parity check which may be provided upon retrieval from storage by cache 50 or storage system 52. Therefore a high degree of confidence is provided in the correctness of data which is received by the processors. Any error which may occur in bus 12 between the parity check element 57 and either of the processors will be detected as a difference in output of the respective processors on buses 16 and 17 or 14 and 15 when the outputs are compared by compare and check circuits 52 and 51, respectively.

More specifically, processors 10, 11 produce two kinds of results, those which change the architected state of the processor (e.g. from operation to operation in the course of performing an instruction) and those which change storage. The first kind of result includes changes to the state of the processor, such as updating the instruction address when execution of an instruction has been completed, in addition to changes to general registers, floating point registers, and the like which occur in response to particular instructions. This type of result is placed on buses 16, 17 by processors 10 and 11, respectively, and the processor outputs are compared by compare and check circuit 52. The results for a particular instruction may be presented in a single processor cycle or distributed over a plurality of processor cycles. Either before or after comparison, compare and check circuit 52 generates parity bits for some parts of the results (e.g. those which update storage) and error correcting codes (e.g. Hamming codes) for other parts of the results (e.g. those that update processor status). When the results are identical, the results which update status, together with their error correcting codes are output to status register 63 over connection 53 and the portions of results which update storage are output with parity bits over connection 55 to cache 50 over connection 54 and, preferably with error correcting codes, to store buffers 61 over connection 55.

The cache 50 and store buffers 61 connect to the storage system 58 in the preferred form of the invention, shown in FIG. 1, which utilizes a store-through cache arrangement. In contrast, in the embodiment of FIG. 2, the store buffers 61 are connected serially in the connection from compare and check circuit 51 to cache 50. Storage system 58 may be either a simple storage array to which only this CPU is connected or it may be a complex storage array or distributed resource to which multiple processors are connected and may include a hierarchy of caching and buffering levels. As is well-understood in the art, the nature of the storage system 58 may affect the design or capabilities of cache 50, but such adaptations are not important to the practice of the invention and are well-understood in the art.

The store buffers 61 have as their main purpose to hold store data generated during a check point until the end of the check point, at which time it is released for transfer to the storage system 58 if no error has been detected. In this preferred embodiment, the structure of the store buffers 61 and the storage system 58 is such that this transfer of store data may require a number of cycles. Moreover, while the store data from one check point is being transferred to the storage system 58 the processors 10, 11 have moved beyond the check point and may be generating additional store data. Later check points may be passed, and store data from them may be released for transfer to the storage system 58 before all of the prior data has been transferred.

Therefore, at any given moment, there may be data from multiple check points in the store buffers 61 waiting to be transferred to the storage system 58, and also data from operations beyond the latest check point which is not yet allowed to be released. To handle this the controls in the storage buffers 61 need to be able to distinguish which class each piece of data belongs to. While a preferred form of providing such controls will be discussed below with reference to FIG. 3, there are a variety of ways in which such controls can be designed which will be evident to those skilled in the art in view of this description of the invention.

Regardless of whether a store-through or store-in cache is used, store buffers 61 provide queuing between the processors 10, 11 and the storage system 58 and serve as a location to store and thus contain potentially erroneous data until it can be determined that no error has occurred during the operations necessary to fully execute an instruction (e.g. between check points, as will be discussed below). The data in the store buffers 61 are associated with error correcting codes and that code is sent with the data when it is transferred to the storage system 58. Therefore, if any bit of any data segment is changed during transmission (more accurately, between compare and check circuit 51 and storage system 58), the correct code can be recovered at the storage system 58. In such a case, it is not necessary to interrupt the processor operation for a retry operation to reconstitute the data when no failure occurred in the processor and processor performance is maintained in full measure.

The processor status element 60 maintains a complete copy of the internal processor status. Every bit of information which can be set at initialization and/or changed by an instruction, and which has an effect on subsequent operation of the processor is maintained in the processor status element 60 and provided to the processors over connections 62. Whenever an instruction changes any such information, the processors present it on the buses 16, 17 to the compare and check element 52, which then passes it on, with error correcting code added, to the status buffer 63, where it is kept until the absence of error is determined at a check point before sending it to the processor status element 60, as will be discussed below.

To limit the time which is required by the CPU for recovery from an error, check points are preferably generated or identified at the completion of every instruction. Since check point processing is accomplished by logic external to processors 10 and 11, the number of processing cycles required for check point processing does not seriously increase program execution time. Check points, as preferably implemented by the invention, have two characteristics which are of importance.

First, enough status information must be saved at each check point that processor system status can be restored to its state at that check point to enable, if an error is detected, retry of execution of an instruction from that check point or transfer of the instruction to another processor. Second, between check points, the CPU must not allow any information to be sent to the remainder of the system if regeneration of that information may still occur in the course of a retry operation.

To generate or identify a check point, it is preferred (in view of the preferred convention of causing a check point to be generated or identified at the successful completion of each instruction) to include a signal in the results placed on buses 16, 17 which will indicate the final operation of an instruction. If the comparison at compare and check circuit 52 is successful, this signal is stored in status buffer 63 and to the store buffers 61 over connections 53 and 55, respectively.

Figure 3:
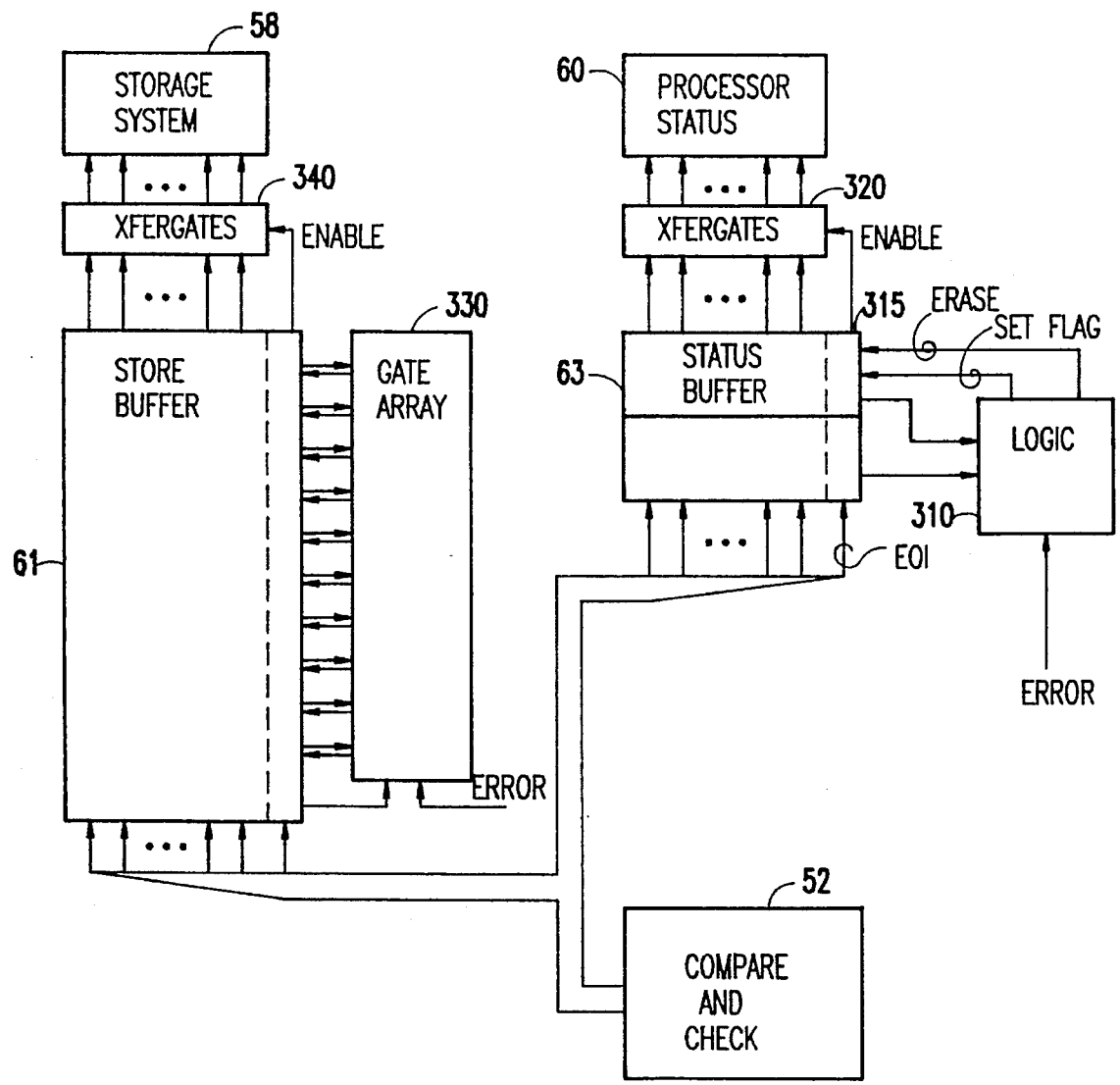
FIG. 3 is a schematic illustration of a portion of FIG. 1 or 2 useful for understanding operation of the invention in regard to checkpoints.

As shown in FIG. 3, this signal may be used to reset flags or initiate some other form of comparison (e.g. a comparison of a check point number against a check point number or flag value) to authorize forwarding of data to storage system 58 if no other error has been detected. For example, as shown in FIG. 3, if it is arranged that the check point is generated by setting an end-of-instruction (EOI) bit in the status code by compare and check circuit 52, that bit can be transferred to status buffer 63 where it can be gated with other signals at logic element 310 such as an output of OR gate 65 (FIG. 1) which indicates an error detection, and the output used to set a flag bit 315 of a previously transmitted status code if no error has occurred. This flag bit can then be used to enable transfer at transfer gate 320 to the processor status register 60. However, if an error has occurred and the flag bit 315 has not been set, the code in the status buffer can be dumped or erased. The logic for accomplishing this function requires no more than a few clocked gates and various suitable arrangements will be evident to those skilled in the art.

Similarly, for the data, an EOI bit can be used to set a flag bit of the last data group or byte generated by the instruction and placed in a queue in store buffer 61. A gate array or other logic arrangement 330 can be made responsive to the receipt of this flag bit in the absence of an error detect signal from OR gate 65 to set a flag bit in each group or byte of data in the queue which has not previously been set in order to enable transfer via transfer gates 340 to storage system 58. On the other hand, if an error signal is received from OR gate 65, gate array 330 is preferably arranged to erase all data in which the flag bit has not yet been set. The logic provided by gate array 330 effectively replicates logic 310 for each stage on the queue in store buffer 61 by either parallel logic or by scanning of the queue. The use of such a flag bit thus individually enables transfer of each group or byte of data and transfer can proceed autonomously at any desired or convenient transmission rate for data which has been released for storage even after an error has been detected while transfer of data which may contain an error is blocked and dumped or erased. Since error correcting codes are included with the signals, error correction can also be carried out autonomously during this period.

The principal difference between the operation of the invention with regard to the status codes and the data is that queuing of status codes will not generally be required and data reconstruction in accordance with error correcting codes will generally be available as a facility of the storage system 58 whereas it is preferably provided in the CPU as ECC element 64 for the status codes. In this latter regard, it is also preferable that a separate connection be provided between status buffer 63 to ECC element 64 in addition to the connection from processor status register 60 to ECC element 64 so that any single bit errors can be identified at either location.

While processor status data is in the processor status element 60 or the status buffer 63 its error correcting code is kept with it. The processors 10, 11 may maintain copies of some of this information internally which they reference on a regular basis. Other parts of the processor status are maintained only in the processor status element 60, and are made available to the processors 10, 11 as needed over connection 62. When the processors 10, 11 need processor status data, it is obtained from the processor status element 60 unless it has been changed and is still in the status buffer 63, in which case it is obtained from the status buffer 63.

The status buffer 63 has as its main purpose to hold the status information generated during a check point until the end of the check point, at which time it is transferred into the processor status element 60, in a manner similar to the operation and function of store buffer 61. In this preferred embodiment, the status buffer 63 and processor status element 60 are structured so that this transfer of status information takes place in a single cycle. Thus, at any given moment, the information in the processor status element 60 corresponds to the complete status of the processor system at the most recent check point. The status codes are then placed on a bus 62 to the processors 10, 11. The bus 62 may consist of only a single set of wires which connect to all destinations, or it may be implemented with separate wires to each destination, depending on the technology used to implement the system.

Failures in this processor system are thus seen to be detected in several different ways. The compare and check elements 51, 52 which compare the cache requests 14, 15 and results 16, 17 that are generated by the processors 10, 11 detect a failure whenever they are not identical because the processors 10, 11 are identical in their design, and are always doing the same operations. Therefore, whenever the requests 14, 15 or the results 16, 17 received from the two processors 10, 11 are different, one of the processors 10, 11 must have experienced a failure. At appropriate internal points, the cache 50 examines the parity of various fields, and if it finds that the parity is not correct it has detected a failure. (Because of the simplicity of parity comparison, it is considered preferable to generate parity bits prior to comparison. The same is true for the generation and comparison of error correcting codes at both compare and check circuits 51, 52.) Also, the data which is provided by the cache 50 on the bus 12 to the processors 10, 11 also connects to a parity check element 57 to determine whether the parity is correct. If it is not, a failure has been detected. A further place where failures are detected is in the ECC element 64 through which processor status data passes before it is placed on the bus 62 to the processors 10, 11. This ECC element 64 corrects single bit failures in the data, but nevertheless reports all failures detected.

When a failure is detected in any of these ways, a signal is sent to an OR circuit 65 which combines all such signals, producing a single failure reporting signal 66 to the error control element 67. When the failure control element 67 receives a signal 66 reporting that a failure has occurred, it intervenes in the normal operation of the processor system by means of a number of control signals 68 which go to various elements, in order to undertake a recovery operation. It causes the processors 10, 11 to stop their normal operations, and to not produce any more results or create any more check points. It causes the store-through cache 50 of FIG. 1 to reset itself and discard all data which it holds. In the case of the store-in cache 50 of FIG. 2, all changed data, which will have been marked for transfer to storage system 58 is transferred and then the cache is reset, discarding remaining data. It causes the store buffers 61 to discard all stored data which is from operations beyond the most recent check point, while continuing to send already released data to the storage system 58, as discussed above with reference to FIG. 3. It causes the processor status element 60 to send out all of its status data through the ECC element 64, onto the bus 62 to the processors 10, 11 and it causes the processors 10, 11 to receive that data and use it to initialize themselves.

As this data is received by the processors 10, 11, it is placed by them onto the result buses 16, 17 to the compare and check element 52, and sent from there to the status buffer 63 and back to the processor status element 60. This serves, during retry, to correct any single bit failures, such as soft errors occurring during storage, which may exist in the processor status element 60, and provides a limited check on the data paths involved in restoring the processor status. It should also be noted that this sequence of operations is performed only where retry is initiated directly from the contents of processor status register 60. Error correction is then carried out based on error correcting codes only when an error has been detected. During normal operation, it is harmless to send an erroneous status code to the processors since an error will then result, be detected by error correction code element 64 and invoke error correction. Therefore, error correction, which requires additional processing cycles does not occur in a critical path of the processor. When these operations are completed without error, the failure control element 67 causes the processors 10, 11 to resume operation.

When operation is resumed after a failure, if the processor system is able to get to a new check point, then the failure is considered to have been transient, and recovery is considered complete. If the processor system is not able to get to a new check point, then the service system 70 may choose to copy the data in the processor status element 60, and transfer it to another processor system. This is often called alternate processor recovery and is well known in the art.

It should be noted in the preferred embodiment of the invention that error correcting code is used in the store buffers 61, status buffer 63, and processor status element 60 because they contain data which is needed for recovery, and error correcting code protects that data against single bit failures. However, because the cache 50 is store-through, its contents can be discarded during recovery, and therefore it is sufficient to use parity checking in the cache 50 to simply detect single bit failures. In the case of the store-in buffer 50 of FIG. 2, however, error correcting codes are preferably provided in the cache, as well, to allow error recovery when (marked) changed data is stored out to storage system 58, as discussed above.

In view of the foregoing, it is seen that the CPU in accordance with the invention systematically combines the best features of dual processor redundancy and comparison, parity checking, code recovery through error correcting code techniques and retry in order to develop a processor with high sensitivity to numerous sources of error and high error recovery capability. Further, through the use of code containment until freedom from error is ascertained, error checking at a very few points is sufficient for numerous sources of error including transmission errors between elements of the processor system. Therefore, error detection and recovery processing will not occur in critical paths of the processor and increase cycle times. The relatively few points of error detection, together with the use of unchecked processors of simplified design, potentially allows the CPU to be fabricated on a single chip and is thus suitable for incorporation in the smallest of personal and notebook computers. Fabrication on a single chip also reduces limitation of minimum cycle time. Therefore, by virtue of the invention, such computers and other may be made of suitable reliability for connection to large networks where freedom from error may be extremely critical to users.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A data processing system including
   two processors arranged to perform identical operations on identical data,
   a status register for storing processor status information which corresponds to a current instruction,
   parity checking means for detecting errors in data input to said two processors,
   means for comparing outputs of said two processors including means for generating parity and error correcting codes in accordance with said outputs,
   buffer means for storing output of said means for comparing outputs of said two processors, including means for correcting said output of said means for comparing outputs of said two processors in accordance with said error correcting codes,
   error detection means responsive to said parity checking means and said means for comparing outputs of said two processors for inhibiting updating of said status register with contents of said buffer means and initiating retry of execution of a current instruction in accordance with contents of said status register.

2. A data processor as recited in claim 1, wherein said status register includes means for transferring the contents of said status register in a single processor cycle.

3. A data processor as recited in claim 1, wherein said buffer means comprises
   store buffer means for storing data to be transferred to a storage system and
   status buffer means for storing a status code.

4. A data processor as recited in claim 3, wherein said status buffer means includes means for storing an error correcting code corresponding to the contents of said status buffer means.

5. A data processor as recited in claim 3, wherein said status register includes means for storing an error correcting code corresponding to the contents of said status register.

6. A data processor as recited in claim 1, wherein said means for comparing outputs of said two processors includes means for comparing memory access requests and generating a parity bit corresponding to said memory access requests.

7. A data processor as recited in claim 1, further including
   means for transferring contents of said status register to another processor.

8. A data processor as recited in claim 1, wherein said two processors are formed on a single chip.

9. A data processor as recited in claim 1, further including a store-through cache.

10. A data processor as recited in claim 1, further including a store-in cache.

11. A data processor as recited in claim 3, wherein said two processors include means for generating a signal indicating completion of a final operation of an instruction.

12. A data processor as recited in claim 11, further including
    means for changing a logical value of a flag bit associated with individual contents of at least one of said storage buffer means and said status buffer means in response to said signal indicating completion of a final operation of an instruction in the absence of an error detection by said error detection means.

13. A data processor as recited in claim 12, further including
    means for transferring contents of said status buffer means to said status register when said flag bit has a first logical value.

14. A data processor as recited in claim 12, further including
    means for transferring contents of said store buffer means to said storage system when said flag bit has a first logical value.

15. A data processor as recited in claim 12, further including
    means for erasing data in said status buffer means which have a flag bit having a second logical value in response to detection of an error by said error detecting means.

16. A data processor as recited in claim 12, further including
    means for erasing data in said storage buffer means which are associated with a flag bit having a second logical value in response to detection of an error by said error detecting means.

* * * * *